United States Patent [19]

Singer et al.

[11] Patent Number: 4,536,534

[45] Date of Patent: Aug. 20, 1985

[54] ALKALINE RESISTANT PRIMER AND THE USE THEREOF

[75] Inventors: Robert Singer; Richard Goetze; Karl Maier; Maximilian Kerbl, all of Burghausen, Fed. Rep. of Germany

[73] Assignee: Wacker-Chemie GmbH, Fed. Rep. of Germany

[21] Appl. No.: 566,522

[22] Filed: Dec. 29, 1983

[30] Foreign Application Priority Data

Jan. 27, 1983 [DE] Fed. Rep. of Germany ....... 3302767

[51] Int. Cl.$^3$ .............................................. B05D 3/02
[52] U.S. Cl. .................... 524/262; 427/387; 427/393.6; 427/407.1; 524/265; 524/269; 524/832
[58] Field of Search ................. 427/393.6, 407.1, 387; 524/262, 261, 265, 269, 832

[56] References Cited

U.S. PATENT DOCUMENTS

| | | | |
|---|---|---|---|
| 3,953,643 | 4/1976 | Cheung et al. | 427/407.1 X |
| 3,983,060 | 9/1976 | Dill | 427/407.1 X |
| 4,125,673 | 11/1978 | Roth et al. | 427/393.6 X |
| 4,225,651 | 9/1980 | Hutton et al. | 427/393.6 X |
| 4,314,004 | 2/1982 | Stoneberg | 427/407.1 X |
| 4,380,595 | 4/1983 | Arpin | 427/407.1 X |

FOREIGN PATENT DOCUMENTS 0757504  8/1980  Sweden ........................... 427/393.6

Primary Examiner—Thurman K. Page
Attorney, Agent, or Firm—Bierman, Peroff & Muserlian

[57] ABSTRACT

An aqueous primer based on alkali-soluble acrylic resins and siliconates, especially suitable for strongly alkaline substrates, for example, asbestos cement articles, is provided. The primer is characterized by stability to storage and good compatibility with the substrate and with customary coating agents, and it brings about good water repellence, good stabilization of the substrate and a good binding between the substrate and the final coating.

14 Claims, No Drawings

ALKALINE RESISTANT PRIMER AND THE USE THEREOF

BACKGROUND OF THE INVENTION

The present invention relates to a primer for mineral substrates, especially for those substrates that react in a strongly alkaline manner, for example owing to their content of hydraulic binders which have not yet been fully reacted, such as cement, lime and the like.

The substrates mentioned generally have porous structures as a result of which, owing to the absorbent properties of the substrate, it is difficult, if not impossible to achieve uniform application and satisfactory coating when applying coatings for improving durability, for protecting the surface and/or for embellishment. Furthermore, in many cases, after the penetration of moisture into unavoidable cracks, such coatings lift from the substrate.

To avoid those difficulties, primers of various compositions, which are intended to isolate the coating from the actual substrate, have already been used. They are applied, for example, when the basic material of the coating is not compatible with the substrate. In this context, reference is made only to the known incompatibility of poly(organosiloxanes) with substrates that react in a strongly alkaline manner and to the low permanence of polyvinyl esters in alkaline media.

Solutions of organic polymers in organic solvents have often been used as primers (see U.S. Pat. No. 3,716,399). The desired isolating action mentioned above has not, however, been found in that case since those solutions were absorbed, for the most part completely, by the substrates. Furthermore, the use of such solutions can scarcely be justified any longer for reasons of work and environmental hygiene and also because of the risk of fire.

It has also already been proposed to use aqueous polymeric dispersions having polymer particles of approximately from 0.02 to 0.1 $\mu$m (see, for example, DE-A-25 31 895 or the corresponding U.S. Pat. No. 4,089,999), which have a satisfactory penetration capacity but which tend to form a gloss where the substrate is not porous. Furthermore, the desired reduction in water adsorption is often not adequate, especially in the case of crack formation, and it is also often difficult to achieve the desired stabilization of the substrate.

OBJECTS OF THE INVENTION

An object of the present invention is the development of a primer which is compatible, even in the long term, both with the substrate and with the top coating, for example a house paint, which protects the substrate simultaneously against the penetration of moisture, which acts as a stabilizer with respect to the substrate and which is harmless with regard to work and environmental hygiene and industrial safety risks.

Another object of the present invention is the development of a primer for mineral substrates that is stable to hydrolysis and to storage and is based on colloidal aqueous solutions of mixtures of synthetic resins, siliconates, organic solvents and, further, to some extent customary, additives, consisting essentially in that 100 parts by weight of the primer contains, in addition to water, from 4 to 15 parts by weight of an alkali-soluble acrylic resin comprising from 86% to 94% by weight of monomer units derived from $C_1$ to $C_8$-alkyl esters of unsaturated acids selected from the group consisting of acrylic acid, methacrylic acid and mixtures thereof, and from 6% to 14% by weight of monomer units derived from unsaturated acids selected from the group consisting of acrylic acid, methacrylic acid, itaconic acid, crotonic acid, maleic acid, fumaric acid and mixtures thereof, and having a K-value according to Fikentscher of not more than 50, from 4 to 40 parts by weight of organic solvents that are water-soluble in the context of the present composition and are selected from the group consisting of compounds containing hydroxy groups, carbonyl groups and mixtures of hydroxy and carbonyl groups, from 0.1 to 1.5 parts by weight of alkali metal organosiliconates, and an alkalinizing agent selected from the group consisting of ammonia, organic amines and mixtures thereof in sufficient quantities that the pH of the primer is at least 8.

A yet further object of the present invention is the development of a method of coating strongly alkaline mineral substrates which comprises applying to a strongly alkaline mineral substrate a primer consisting essentially in that 100 parts by weight of the primer contains, in addition to water, from 4 to 15 parts by weight of an alkali-soluble acrylic resin comprising from 86% to 94% by weight of monomer units derived from $C_1$ to $C_8$-alkyl esters of unsaturated acids selected from the group consisting of acrylic acid, methacrylic acid and mixtures thereof, and from 6% to 14% by weight of monomer units derived from unsaturated acids selected from the group consisting of acrylic acid, methacrylic acid, itaconic acid, crotonic acid, maleic acid, fumaric acid and mixtures thereof, and having a K-value according to Fikentscher of not more than 50, from 4 to 40 parts by weight of organic solvents that are water-soluble in the contect of the present composition and are selected from the group consisting of compounds containing hydroxy groups, carbonyl groups and mixtures of hydroxy and carbonyl groups, from 0.1 to 1.5 parts by weight of alkali metal organosiliconates, and an alkalinizing agent selected from the group consisting of ammonia, organic amines and mixtures thereof in sufficient quantities that the pH of the primer is at least 8.

These and other objects of the invention will become more apparent as the description thereof proceeds.

DESCRIPTION OF THE INVENTION

The drawbacks of the prior art have been overcome and the above objects have been achieved by the development of a primer for mineral substrates that is stable to hydrolysis and to storage and is based on colloidal aqueous solutions of mixtures of synthetic resins, siliconates, organic solvents and, further, to some extent customary, additives, consisting essentially in that 100 parts by weight of the primer contains, in addition to water, from 4 to 15 parts by weight of an alkali-soluble acrylic resin comprising from 86% to 94% by weight of monomer units derived from $C_1$ to $C_8$-alkyl esters of unsaturated acids selected from the group consisting of acrylic acid, methacrylic acid and mixtures thereof, and from 6% to 14% by weight of monomer units derived from unsaturated acids selected from the group consisting of acrylic acid, methacrylic acid, itaconic acid, crotonic acid, maleic acid, fumaric acid and mixtures thereof, and having a K-value according to Fikentscher of not more than 50, from 4 to 40 parts by weight of organic solvents that are water-soluble in the context of the present composition and are selected from the group consisting of compounds containing hydroxy groups, carbonyl groups and mixtures of hydroxy and carbonyl groups from 0.1 to 1.5 parts by weight of alkali metal organosiliconates, and an alkalinizing agent selected from the group consisting of ammonia, organic amines and mixtures thereof in sufficient quantities that the pH of the primer is at least 8.

The advantages of the primer can be seen especially clearly in the case of its application to strongly alkaline mineral substrates, for example fresh asbestos cement surfaces, which can then be coated without difficulty with customary protective layers or coatings, for example those based on synthetic resins.

The primer according to the invention contains, colloidally dissolved in water, at least one alkali-soluble acrylic resin in amounts of from 4 to 15 parts by weight, preferably from 6 to 9 parts by weight, and from 0.1 to 1.5, preferably from 0.15 to 0.5, parts by weight of alkali metal organosiliconates, and from 4 to 40, preferably from 4 to 15, parts by weight of organic solvents that are water-soluble at least in the context of the present composition and are selected from the group consisting of compounds containing hydroxy and/or carbonyl groups, and also ammonia and/or organic amines in sufficient quantities that the pH of the primer is at least 8, preferably from 8 to 11, especially from 9 to 10, and optionally from 0.2 to 1 part by weight of one or more customary anti-foaming agents, and water in sufficient quantities to make the primer up to 100 parts by weight.

There come into consideration as synthetic resins only those resins that are stable to hydrolysis in an alkaline pH range, even when stored for a relatively long period of time. There may be mentioned in this context copolymers consisting of monomer units derived from esters of acrylic and/or methacrylic acid with alkanols having from 1 to 8 carbon atoms and monomer units derived from unsaturated carboxylic acids selected from the group consisting of acrylic, methacrylic, itaconic, crotonic, maleic and/or fumaric acid. The copolymer contains from 86% to 94%, preferably from 90% to 94% by weight of (meth)acrylic acid ester units and from 6% to 14%, preferably from 6% to 10%, by weight of carboxylic acid units (the values complementing each other to 100% by weight). As monomers that are suitable for the manufacture of the above copolymers, there may be mentioned especially methyl (meth)acrylate, ethyl (meth)acrylate, propyl (meth)acrylate, butyl (meth)acrylate ethylhexyl (meth)acrylate, hexyl (meth)acrylate, acrylic acid, methacrylic acid, itaconic acid, crotonic acid, maleic acid, fumaric acid and maleic acid anhydride. The mentioned acrylates and methacrylates, and acrylic acid and methacrylic acid, are preferred. The suitable copolymers have a K-value according to Fikentscher of not more than 50, preferably from 20 to 45. They are preferably manufactured according to the emulsion polymerization process in an aqueous emulsion.

The alkali metal siliconates used for the manufacture of the primer according to the invention may be derived from any desired alkali metal, that is to say from lithium, sodium, potassium, rubidium, or caesium. They are derived preferably from sodium or especially preferably from potassium. They may contain from 1 to 4 alkali metal atoms per silicon atom. The compounds may be monomeric compounds of the general formula

$$R_a Si(OM)_{4-a} \quad\quad\quad I$$

in which M is the alkali metal atom, R is a $C_1$–$C_4$ alkyl radical, for example a methyl or propyl radical, and A is 0 or 1, and/or polymeric compounds, for example those consisting of units of the formulae

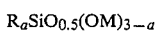

$$R_a SiO_{0.5}(OM)_{3-a} \quad\quad\quad II$$

and

$$R_a SiO(OM)_{2-a} \quad\quad\quad III$$

in which M, R and a have the meanings given above.

If desired, it is possible to use a mixture of two or more different compounds of the type indicated. If desired, it is also possible to use, in admixture with those compounds mentioned above, alkali metal compounds of organosilanols having Si-atoms bonded through silcarbane bonds, for example methylene, ethylene or propylene groups. The manufacture of all these compounds is known.

If single compounds of the types mentioned above are used, then each of them has one organo group per Si-atom, in the case of mixtures of such compounds the average value of a is greater than 0.

For neutral substrates, sodium or potassium methylsiliconate or sodium or potassium propylsiliconate are preferably used. For strongly alkaline substrates, potassium propylsiliconate is more suitable and is therefore especially preferred.

For relatively simple, trouble-free use, it is occasionally preferred to add additionally from 0.2 to 1 part by weight of an anti-foaming agent, based on a total weight of 100 parts by weight of the primer according to the invention. Suitable anti-foaming agents, which are commercially available, are known to the person skilled in the art or can be selected by him using a few routine preliminary tests. Apart from effectiveness and compatibility of the anti-foaming agent, it is also important when making the selection that the anti-foaming agent does not float excessively when diluted in the primer and, if necessary, can be worked in again easily, for example by stirring for a short time.

The primer according to the invention, which is in the form of an aqueous colloidal solution, contains, additionally, organic amines and/or, in especially preferred manner, ammonia or the corresponding protonated forms thereof (corresponding acids according to the Brönsted theory, see Holleman-Wiberg, "Lehrbuch der anorganischen Chemie", 81st to 90th edition, Berlin/New York 1976, page 217), such that the pH of the primer is at least 8.

There may be mentioned as amines, primary and secondary amines of the formula $NR'_b H_{3-b}$, in which R' represents $CH_3$, $C_2H_5$, $n$-$C_3H_7$, iso-$C_3H_7$, $n$-$C_4H_9$, tert-$C_4H_9$, sec-$C_4H_9$ and b represents 1 or 2. Also suitable are aminoalcohols (hydroxyalkylamines), for example aminoethanol and aminopropanol and the derivatives thereof substituted at the nitrogen atom by methyl and/or ethyl groups. Preferably, however, the primer according to the invention contains ammonia and ammonium ions (as reaction product with the other components of the primer, for example with the carboxylic groups of the acrylic resin).

Finally, the primer also contains organic solvents that are water-soluble at least in the context of the present composition and are selected from the group consisting of compounds which contain hydroxy and/or carbonyl groups and which should not be hydrolysable. There may be mentioned alcohols, ketones, glycol ethers and, less preferably, esters and ketoesters, or mixtures of those compounds. Those solvents must be water-miscible at least within the given limits. The choice depends on the intended use. For use at ambient temperature, for example up to 35° C., ethanol, propanol and/or isopropanol are preferred, and, especially for industrial use with forced drying, also less volatile compounds, such as butoxyethoxyethanol (butyl diglycol) and/or diacetone alcohol or mixtures of those compounds. The penetration depth can be controlled in a surprisingly simple manner by the amount of solvent. In general, an amount in the lower part of the mentioned range of amounts is adequate and therefore also preferred.

It is also possible to incorporate further additives in their customary amounts, for example biocides, especially fungicides, and dyestuffs.

The primer can be applied in any desired customary manner, for example by immersion, brushing, spraying, pouring, spreading by means of doctor blades, and rolling.

The advantages of the primer according to the invention are made clear by the following examples. They can be summarized as follows:

The primer is stable to hydrolysis, can be stored in closed barrels almost indefinitely, can be used in enclosed spaces virtually without risk of fire and with virtually no risks with regard to work hygiene and environmental hygiene, since it is largely aqueous. It is compatible with mineral substrates, even strongly alkaline mineral substrates, and also with customary coatings applied thereto. It provides for good adhesion of the coating to the substrate. It gives good results with regard to water repellence, even when cracks form in the substrate, and it also stabilizes the substrate. Finally, it solves, in excellent manner, the original problem of a primer for mineral substrates: the absorbent action of the substrates is considerably reduced.

As a further advantage, it should also be mentioned that it is also possible to manufacture a form of the primer according to the invention suitable for marketing using less water, as a result of which considerable savings in storage requirements can be made. To prepare the primer according to the invention, the user is required only to dilute the marketed form to the given concentrations for use using water, optionally with the addition of a little ammonia and/or amines. For example, a form for marketing can be manufactured with water using only a quarter, preferably a third, especially half, of the water (depending on the K-value), that is to say in up to double, three-fold, or even four-fold, concentration.

The following examples are illustrative of the invention without being limitative.

RECIPE EXAMPLE 1 (according to the invention)

A primer, adjusted to pH 9 to 9.5 using ammonia, was manufactured from 8 parts by weight of a copolymer having a K-value according to Fikentscher of approximately 45 and having the following composition:
46% by weight of butyl acrylate units,
46% by weight of methyl methacrylate units, and
8% by weight of acrylic acid units;
4.2 parts by weight of a mixture of 4 parts by weight of butyl diglycol and 0.2 part by weight of isopropanol;
0.2 part by weight of a customary silicone-based antifoaming agent (SLM 54291, Wacker-Chemie GmbH, Munich, Germany); and
0.18 part by weight of potassium propylsiliconate (Wacker Silicone BS 20, Wacker-Chemie GmbH, Munich, Germany)

in water so that the total amount of primer was 100 parts by weight.

RECIPE EXAMPLE 2 (according to the invention)

Recipe example 1 was modified to the effect that 10 parts by weight of isopropanol were used instead of the mixture of butyl diglycol and isopropanol, and 0.16 part of potassium propylsiliconate was used.

RECIPE EXAMPLE 3 (according to the invention)

Recipe example 2 was modified to the effect that it contained 15 parts by weight of isopropanol.

RECIPE EXAMPLE 4 (according to the invention)

Recipe example 2 was modified to the effect that the content of the copolymer was increased from 8 to 11 parts by weight and the copolymer had a K-value according to Fikentscher of 35.

RECIPE EXAMPLE A (comparison)

A solution, adjusted to a solids content of 14% by weight, of a copolymer consisting of 80% by weight of vinyl acetate units and 20% by weight of vinyl laurate units (Vinnapas® B 100/20 VLE Wacker-Chemie GmbH, Munich, Germany) in a mixture of solvents comprising esters, alcohols and hydrocarbons having a boiling range below 120° C. (safety characteristic number of Vinnapas® solution B 100/20 VLE: Verordnung über brennbare Flüssigkeiten (VbF) (Regulation on flammable liquids): Al; Gefahrengutverordnung Eisenbahn (GGVE) (Dangerous goods Railway Regulation: 3.2; flammability group G1, flammability temperature 460° C.; MAK (maximum workplace concentration) value: 1400 mg/m$^3$; obliged to carry marking within the meaning of VO über gefährliche Arbeitsstoffe (Regulation relating to dangerous work materials) of 8.9.1975 according to §1 (1)/3 [Flamme(flame)]).

RECIPE EXAMPLE B (comparison)

3.2% by weight, based on the toatl weight, of a methylsilicone resin (Wacker Silicone BS31, Wacker-Chemie GmbH, Munich, Germany) were added additionally to recipe A.

RECIPE EXAMPLE C (comparison)

Recipe 2 was modified to the effect that the content of copolymer was increased to 12 parts by weight and the content of isopropanol was increased to 20 parts by weight, and that the siliconate was omitted.

RECIPE EXAMPLE D (comparison)

A finely particulate plastics dispersion based on a styrene/acrylate copolymer having a solids content of 8% by weight.

EXAMPLE 1

Blocks of aerated concrete (10 cm×5 cm×2 cm) were immersed for 15 seconds in the primers of Recipe 1 and Recipe A, respectively, approximately 8 g, corresponding to 640 mg of copolymer, being absorbed in each case, and then the blocks were dried for 3 days at room temperature. For testing, the blocks were stored in water for the periods of time indicated and then weighed.

The results are listed in Table 1.

| Primer | water absorption in % by weight after storage in water for | |
|---|---|---|
| | 5 min | 15 min |
| none | 31 | 42 |
| Recipe 1 | 4 | 12 |
| Recipe A | 24 | 34 |

EXAMPLE 2

Primers according to the recipes given in Table 2 were applied with a paint brush to gypsum plates. The primer was assessed as "bad" if at least 100 g of the agent in each case could not be applied within 10 minutes. The assessments "very good" to "average" indicate to what extent glossy patches appeared.

Stabilization was measured with a scratching device, the spike of which is capable of carrying various weights. The better was the stabilization of the substrate, the smaller was the width of the scratch groove. The tests were carried out after drying for 3 days at room temperature.

The water repellence was determined using the water drop test. In that case, the time for complete absorption of 2 ml of water by the test article is measured.

TABLE 2

| Recipe | water drop test (min) | scratching test with load | | penetration |
|---|---|---|---|---|
| | | 2 kg | 5 kg | |
| 2 | 150 | 1.0 mm | 1.9 mm | very good |
| 3 | 300 | 1.0 mm | 2.0 mm | average-good |
| 4 | >240 | 1.0 mm | 1.5 mm | good |
| A | 15 | 1.2 mm | 2.3 mm | good |
| B | >240 | 1.2 mm | 2.1 mm | good |
| C | 100 | 0.7 mm | 1.8 mm | average-bad |
| D | 10 | 1.2 mm | 2.0 mm | good |

EXAMPLE 3

Untreated asbestos cement plates were immersed for 15 seconds in the respective primer. Excess primer was stripped off between two rollers. The plates were then dried for 10 minutes at 130° C. The test of water absorption analogous to Example 1 was carried out after 24 hours additional storage at room temperature (see Table 3).

TABLE 3

| Recipe | Water absorption in % by weight after storage in water for | | Remarks |
|---|---|---|---|
| | 15 min | 60 min | |
| 1 | 4.0 | 12.0 | |
| A | 16.5 | 17.0 | |
| B | 15.5 | 17.5 | |
| D | could not be determined since | | primer swelled and partially peeled. |

The preceding specific embodiments are illustrative of the practice of the invention. It is to be understood, however, that other expedients known to those skilled in the art or disclosed herein can be employed without departing from the spirit of the invention or the scope of the appended claims.

We claim:

1. A primer for mineral substrates that is stable to hydrolysis and to storage and is based on colloidal aqueous solutions of mixtures of synthetic resins, siliconates, organic solvents and additives, consisting essentially in that 100 parts by weight of the primer contains, in addition to water,
   from 4 to 15 parts by weight of an alkali-soluble acrylic resin comprising from 86% to 94% by weight of monomer units derived from $C_1$ to $C_8$-alkyl esters of unsaturated acids selected from the group consisting of acrylic acid, methacrylic acid and mixtures thereof, and from 6% to 14% by weight of monomer units derived from the unsaturated acids selected from the group consisting of acrylic acid, methacrylic acid, itaconic acid, crotonic acid, maleic acid, fumaric acid and mixtures thereof, and having a K-value according to Fikentscher of not more than 50,
   from 4 to 40 parts by weight of organic solvents that are water-soluble in the context of the present composition and are selected from the group consisting of compounds containing hydroxy groups, carbonyl groups and mixtures of hydroxy and carbonyl groups
   from 0.1 to 1.5 parts by weight of alkali metal organosiliconates, and an alkalinizing agent selected from the group consisting of of ammonia, organic amines and mixtures thereof in sufficient quantities that the pH of the primer is at least 8,
   from 0 to 1 part by weight of at least one compatible anti-foaming agent.

2. The primer of claim 1 having a further content of from 0.2 to 1 part by weight of at least one compatible anti-foaming agent, per 100 parts by weight.

3. The primer of claim 1 having from 6 to 9 parts by weight of said alkali-soluble acrylic resin and from 0.15 to 0.5 parts by weight of said alkali metal organosiliconates.

4. The primer of claim 1 having from 4 to 15 parts by weight of said organic solvents.

5. The primer of claim 3 having from 4 to 15 parts by weight of said organic solvents.

6. The primer of claim 1 having a pH of from 8 to 11.

7. The primer of claim 1 having a pH of from 9 to 10.

8. The primer of claim 5 wherein said alkali metal siliconate is selected from the group consisting of sodium methylsiliconate, potassium methylsiliconate, sodium propylsiliconate and potassium propylsiliconate.

9. A method of coating strongly alkaline mineral substrates which comprises applying to a strongly alkaline mineral substrate a primer consisting essentially in that 100 parts by weight of the primer contains, in addition to water,
   from 4 to 15 parts by weight of an alkali-soluble acrylic resin comprising from 86% to 94% by weight of monomer units derived from $C_1$ to $C_8$-alkyl esters of unsaturated acids selected from the group consisting of acrylic acid, methacrylic acid and mixtures thereof, and from 6% to 14% by weight of monomer units derived from unsaturated acids selected from the group consisting of acrylic acid, methacrylic acid, itaconic acid, crotonic acid, maleic acid, fumaric acid and mixtures thereof, and having a K-value according to Fikentscher of not more than 50, from 4 to 40 parts by weight of organic solvents that are water-soluble in the context of the present composition and are selected from the group consisting of compounds containing hydroxy groups, carbonyl groups and mixtures of hydroxy and carbonyl groups from 0.1 to 1.5 parts by weight of alkali metal organosiliconates, and an alkalinizing agent selected from the group consisting of ammonia, organic amines and mixtures thereof in sufficient quantities that the pH of the primer is at least 8 and from 0 to 1 part by weight of at least one compatible anti-faming agent.

10. The method of claim 9 wherein said primer has a further content of from 0.2 to 1 part by weight of at least one compatible anti-foaming agent, per 100 parts by weight.

11. The method of claim 9 wherein said primer has from 6 to 9 parts by weight of said alkali-soluble acrylic resin and from 0.15 to 0.5 parts by weight of said alkali metal organosiliconates.

12. The method of claim 9 wherein said primer has from 4 to 15 parts by weight of said organic solvents.

13. The method of claim 9 wherein said primer has a pH of from 8 to 11.

14. The method of claim 9 wherein said alkali metal siliconate is selected from the group consisting of sodium methylsiliconate, potassium methylsiliconate, sodium propylsiliconate and potassium propylsiliconate.

* * * * *